United States Patent Office 2,947,135
Patented Aug. 2, 1960

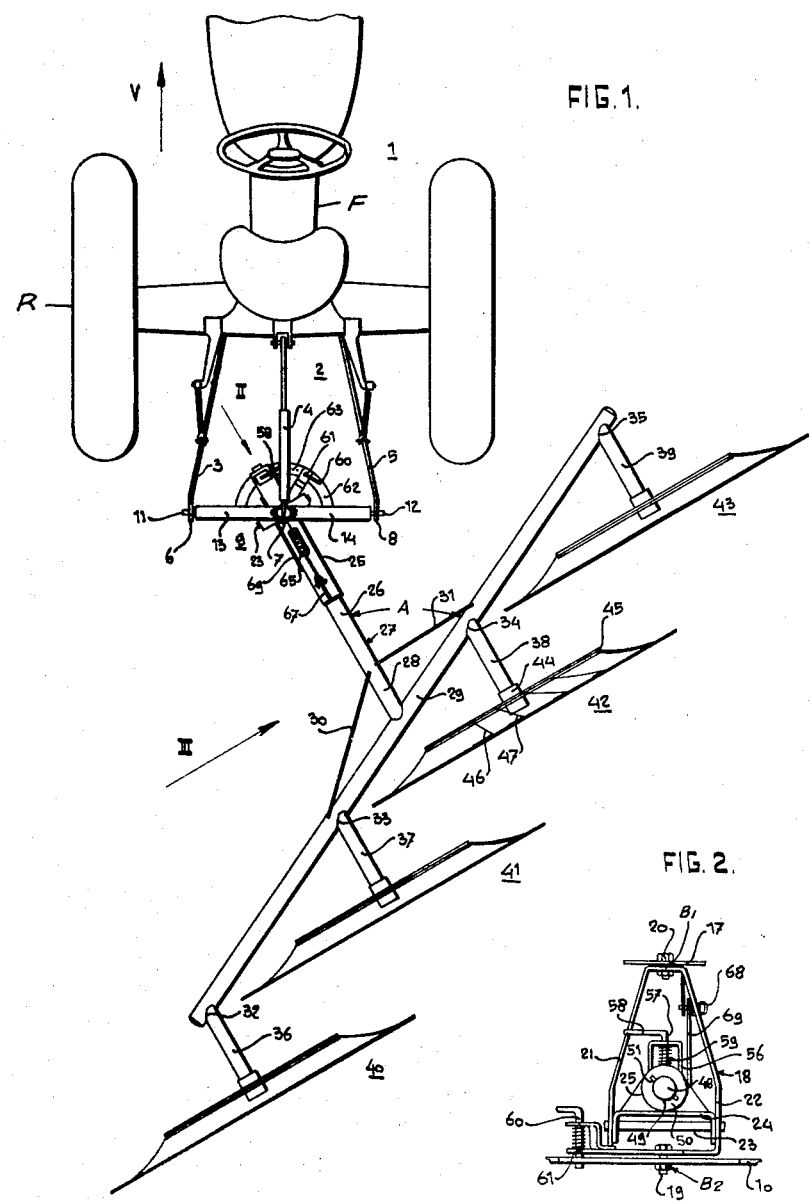

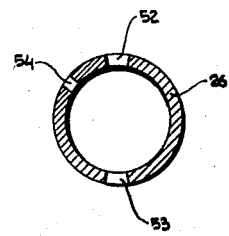
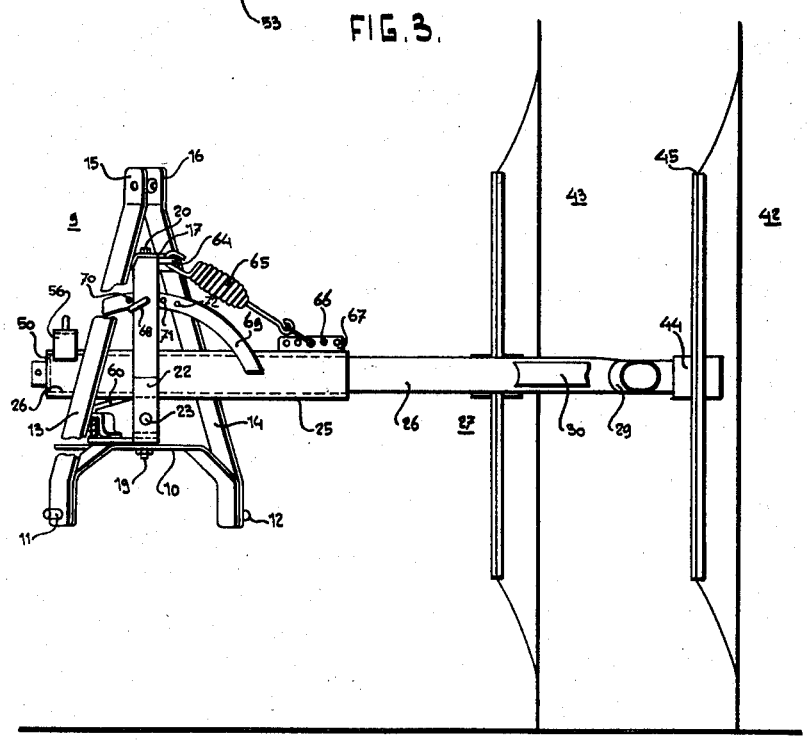
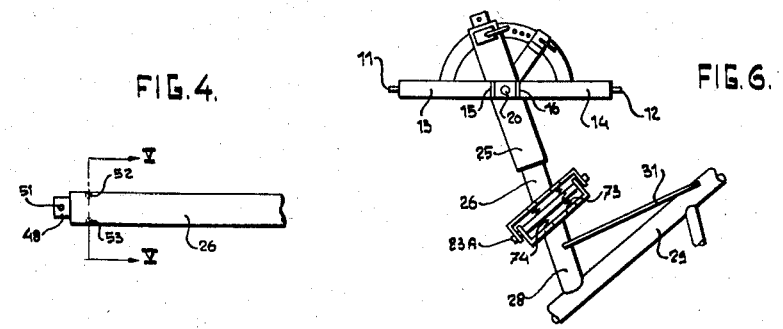

2,947,135

IMPLEMENT FOR LATERALLY DISPLACING MATERIAL LYING ON THE GROUND

Cornelis van der Lely and Ary van der Lely, Maasland, Netherlands, assignors to C. van der Lely N.V., Maasland, Netherlands, a Dutch limited-liability company Filed Apr. 4, 1956, Ser. No. 576,114

Claims priority, application Netherlands Apr. 28, 1955

4 Claims. (Cl. 56—377)

The invention relates to implements for laterally displacing material lying on the ground.

Implements are known which are provided with rake wheels rotatable about axles attached to a support which is suitable for being connected to the lifting device of a tractor. In general, these known implements are supported by one or more running wheels and are not adjustable in order to meet different working conditions.

It is an object of the present invention to provide a new implement, of the kind mentioned, having special advantages and in which running wheels are superfluous and adaptation to different functions is readily effected.

A further object of the invention is to provide a conveniently transportable rake.

Another object of the invention is to provide an implement with improved means for the rake wheels to adjust themselves to uneven terrain over which they may be operated and improved means for adjusting the rake wheels to different working conditions and different functions.

According to the invention, a coupling device is provided for fastening the support of an implement to the lifting device of a tractor and in which a rake wheel support is rotatable with respect to said coupling device about an axle which is substantially parallel to the axles of the rake wheels.

Further features and details of the invention will be hereinafter more fully described with reference to the accompanying drawing in which:

Fig. 1 is a top plan view of an implement according to the invention arranged as a side delivery rake fixed behind a tractor, Fig. 2 is a front view of a part of the coupling device viewed in the direction of arrow II in Fig. 1, Fig. 3 is an enlarged partial side view of the implement viewed in the direction of arrow III in Fig. 1, Fig. 4 illustrates the foremost extremity of an axle of the frame of the implement of Figs. 1–3.

Fig. 5 shows, in enlarged scale, a section through the axle of Fig. 4, said section being taken along line V—V in Fig. 4, Fig. 6 is a plan elevation of a part of an implement which is a modification of the structure shown in Figs 1–5.

As shown in Fig. 1, a tractor 1 having running wheels R and a frame F is provided with a lifting device 2 comprising three arms 3, 4 and 5, the rear sections 6, 7 and 8 of said arms being connected to a coupling device 9 of the implement. As appears in Figs. 2 and 3, the coupling device comprises a bow or yoke 10 carrying coaxial pins or pivots 11 and 12 which are connected to the parts or sections 6 and 8 of the arms 3 and 5. The coupling device moreover includes two bars 13 and 14, each of said bars being directed obliquely upwards and fixedly connected to bow 10. Bars 13 and 14, at a distance from their uppermost ends 15 and 16 which are connected to the end 7 of the arm 4, are mutually connected by a strip 17. Between the strip 17 and the bow 10 is arranged a frame 18 which is rotatable about a vertical axis defined by two bolts or axles 19 and 20 accommodated in bearings B1 and B2. Through limbs 21 and 22 of said frame passes an axle 23 which, during normal operation, is practically horizontal. A bow 24 is rotatable about said axle and to this bow 24 is fixedly connected a tube or bearing 25 which forms a bearing for the front end 26 of an axle 27 which is usually approximately horizontal during operation. The three coupled axles or pivot means 23, 27 and 19—20 are mutually perpendicular. The hind-part 28 of the axle 27 carries a support or frame beam 29, the connection being supplemented by means of strips 30 and 31. The angle A between the beam 29 and the axle 27 is preferably more than 60°. As positions 32, 33, 34 and 35, rearwardly directed axles 36, 37, 38 and 39 are fixed to the frame beam 29.

These axles are all approximately parallel to the axle 27 and support rake wheels 40, 41, 42 and 43, respectively. The rake wheel 42 comprises a hub 44 which is rotatably, but not slidably, arranged on the axle 38, a rim 45 connected to the hub 44 by spokes (not shown) and peripheral teeth such as the teeth 46, 47. The other rake wheels have the same construction as the rake wheel 42.

The front end 26 of the axle 27 has a reduced diameter part or portion 48 (see Fig. 4) which through an opening 49 extends into a disc 50 which closes the tube 25 at one end. Through the part 48 is inserted a split locking pin or device 51 so that the axle 27 cannot slide in the tube 25. Furthermore, as shown in Figs. 4 and 5, the front end 26 of the axle 27 which is a tube, is provided with two diametrically opposed oblong openings 52 and 53 and a round opening 54 situated in the same cross-section. On the tube 25 is arranged a bow 56 (see Fig. 2). Through said bow and the tube 25 is put a locking pin 57 provided with a handle 58. Pin 57 can selectively extend through each of the openings 52, 53 and 54 and is urged into locking position by a spring 59. When the pin 57 extends into one of the openings 52 or 53, the axle 27 can rotate through a small angle.

The rotation of the frame 18 can be prevented by means of a locking pin or device 60 which can fix an arm 61 of the frame 18 with regard to an arcuate strip 62 (Fig. 1) which for this purpose is provided with openings 63 and is fixed to the bow 10.

The frame 18 carries an eye 64 (Fig. 3) in which is hooked one extremity of a tension spring 65. The other extremity of said spring 65 is connected to one of the openings 66 in a strip 67 on the tube 25. By means of a locking pin or device 68 which can fix an arcuate strip 69 on the tube 25 with regard to the frame 18, the axle 27 can be given a fixed position with regard to the frame 18 and therefore eliminate the possibility of its rotation about the axle 23. For this purpose, the strip 69 is provided with a number of openings such as openings 70, 71 and 72.

The use and the operation of the implement described are as follows.

When the tractor 1 moves in the direction of the arrow V and the locking pin 60 has been placed in a suitable position, with the pin 68 removed and the spring 65 having suitable tension (and provided also that the lifting device has been adjusted to a suitable height), the rake wheels 40–43 rest upon the ground with slight pressure, whereby they are made to rotate and to discharge, to the left, material lying on the ground. Since the beam 29 can pivot about the axle 23 and can rotate with the axle 27, the wheels 40–43 can readily adapt themselves to uneven fields. Rotations about the axle 23 particularly compensate differences in height, while rotations about the axle 27 accommodate inclinations of the field to the right or left. The rake wheels are horizontally adjustable about the axis determined by the bolts 19 and 20 for adjusting the rake wheels transversely to the travelling direction. When the implement is raised by means of the lifting device 2, all rake wheels lose contact with the ground, because the angle by which the axle 27 can turn is limited by the extremities of one of the slots 52 and 53 which act as stops for the pin 57. When the implement is raised sufficiently above the ground, the pin 57 can be pulled out such that the axle 27 turns through an angle of 50° or 180°. After turning over 50°, a position is obtained which is suitable for transport of the implement. The pin 57 engages the opening 54; in this case the width of the implement is small. After turning over 180° and a lowering of the implement, each rake wheel 40-43 starts working independently of the other rake wheels and the implement operates as a teddering device. The transformation from a raking into a teddering device and conversely can therefore be effected in a very simple manner.

The pin 68 has two functions:

(1) In treating heavy crops, a great force is exerted over the lowest parts of the rake wheels tending to raise the same. For such heavy crops, it is desirable to engage the pin 68 in strip 69, whereby a turning about the axle 23 is impossible.

(2) In the transformation from raking into teddering, the rake wheel 40 moves close to the ground and there is the danger that the rake wheel 40 might come into contact with the ground before it is in its lowest position.

In order to change from a raking to a teddering operation, the lifting device is lowered to the lowest position possible, whereupon the pin 68 is put through the bar 22 into the opening 72 furthest to the right (Fig. 3) in the strip 69 and the lifting device is raised to the highest position possible. The axle 27 is thus in a backwardly and upwardly directed position and the wheel 40 remains free from the ground during transition.

While, in the implement shown in Figs. 1–5, the axle 23 is practically perpendicular to the axles 36–39, Fig. 6 shows a part of an implement which is similar to the implement already described, but in which the axle 23 has been incorporated into the axle 27 and is comprised in a vertical plane comprising the direction of the series of the rake wheels 40–43. In Fig. 6, the axle in changed position is indicated as axle 23A. A stiff spring 73 above and a stiff spring 74 below the axle 23A tend to keep the axle ends 26 and 28 aligned.

In both cases described the center of gravity of the frame with the rake wheels is preferably placed approximately in a vertical plane comprising the axle 27 (assuming that the implement is in one of its working positions). It is very advantageous to place the center of gravity in the axle 27 itself. The axle 27 and the axle determined by the limbs 19 and 20 are preferably comprised in a single plane.

What we claim is:

1. Apparatus for displacing material lying on the ground and having a determinable direction of travel comprising freely rotatable rake wheels arranged in a row and operatively associated for displacing said material, a frame supporting said rake wheels, and means coupled to and supporting said frame and thereby said rake wheels for movement about a substantially horizontal axis parallel to said wheels in order to accommodate irregularities in the ground traversed.

2. Apparatus as claimed in claim 1 wherein said means further provides for a limited pivotal movement of the frame about a horizontal axis perpendicular to the first said horizontal axis.

3. Apparatus as claimed in claim 1 comprising means supporting said means for pivotal movement about a horizontal axis transverse to said direction of travel.

4. Apparatus as claimed in claim 1 comprising a locking device operatively associated with said means for preventing movement of the frame about said horizontal axis.

References Cited in the file of this patent

UNITED STATES PATENTS

| | | |
|---|---|---|
| 1,618,502 | Worthington | Feb. 22, 1927 |
| 1,728,098 | Bork | Sept. 10, 1929 |
| 1,848,359 | Krause | Mar. 8, 1932 |
| 2,369,436 | Court | Feb. 13, 1945 |
| 2,468,313 | Turner | Apr. 26, 1949 |
| 2,621,465 | Klemm | Dec. 16, 1952 |
| 2,689,446 | Sorrels | Sept. 21, 1954 |
| 2,711,065 | Orelind | June 21, 1955 |

FOREIGN PATENTS

| | | |
|---|---|---|
| 161,925 | Australia | Mar. 14, 1955 |